United States Patent [19]

Kurtz et al.

[11] Patent Number: 4,525,257

[45] Date of Patent: Jun. 25, 1985

[54] LOW LEVEL IRRADIATED LINEAR LOW DENSITY ETHYLENE/ALPHA-OLEFIN COPOLYMERS AND FILM EXTRUDED THEREFROM

[75] Inventors: Stuart J. Kurtz, Martinsville; James E. Potts, Millington, both of N.J.

[73] Assignee: Union Carbide Corporation, Danbury, Conn.

[21] Appl. No.: 452,937

[22] Filed: Dec. 27, 1982

[51] Int. Cl.³ .............................. B29F 3/06; C08F 2/46
[52] U.S. Cl. ................................ 204/159.2; 525/222; 525/227; 264/176 R; 264/288.4
[58] Field of Search ...................... 204/159.2; 525/227, 525/222; 264/176, 288.4

[56] References Cited

U.S. PATENT DOCUMENTS

| | | | |
|---|---|---|---|
| 3,022,543 | 2/1962 | Baird, Jr. et al. | 428/36 |
| 3,090,770 | 5/1963 | Gregorian | 525/240 |
| 3,530,084 | 9/1970 | Potts | 524/563 |
| 3,563,870 | 2/1971 | Tung et al. | 204/159.2 |
| 3,886,056 | 5/1975 | Kitamaru et al. | 204/159.2 |
| 4,226,905 | 10/1980 | Harbourne | 428/220 |
| 4,243,619 | 1/1981 | Fraser | 264/40.6 |
| 4,310,484 | 1/1982 | Blakeslee | 264/176 |
| 4,330,501 | 5/1982 | Jones et al. | 264/566 |
| 4,339,507 | 7/1982 | Kurtz et al. | 428/522 |
| 4,348,349 | 9/1982 | Kurtz | 264/564 |
| 4,360,494 | 11/1982 | Kurtz | 264/564 |

FOREIGN PATENT DOCUMENTS

| | | |
|---|---|---|
| 788440 | 6/1968 | Canada. |
| 047171 | 3/1982 | European Pat. Off. . |
| 047625 | 3/1982 | European Pat. Off. . |
| 871586 | 6/1961 | United Kingdom. |
| 2019412 | 10/1979 | United Kingdom. |

OTHER PUBLICATIONS

"Crosslinking Effects on Flow of Irradiated Polyolefins", (Markovic et al.)—*Modern Plastics*, Oct. 1979, p. 53.

Primary Examiner—Theodore Morris
Attorney, Agent, or Firm—Clement J. Vicari

[57] ABSTRACT

Low level irradiation of narrow molecular weight distribution, linear, low density ethylene/alpha-olefin copolymer sufficient to introduce crosslinks into the copolymer but insufficient to provide for significant gelation produces improved copolymer rheology providing superior film fabrication.

36 Claims, 5 Drawing Figures

FILM FABRICATION RATES FOR BLENDS OF IRRADIATED AND NONIRRADIATED LLDPE

FIG. 4 ial to high density polyethylenes in overall tensile

LOW LEVEL IRRADIATED LINEAR LOW DENSITY ETHYLENE/ALPHA-OLEFIN COPOLYMERS AND FILM EXTRUDED THEREFROM

BACKGROUND OF THE INVENTION

1. Field of the Invention

This invention relates to irradiated polyethylene having superior film fabrication properties. More particularly, the present invention relates to low level irradiated, linear, low density, ethylene/alpha-olefin copolymers and to processes for the manufacture of film from such material.

2. Description of the Prior Art

Linear, low density, ethylene/alpha-olefin copolymers which are substantially free from long chain branching and have a narrow molecular weight distribution, hereinafter referred to as "LLDPE", exhibit a superior balance of mechanical properties when compared with other polyethylenes. Low density polyethylenes, both LLDPE and conventional, long chain branched (LCB), possess a superior balance of properties to high density polyethylenes in overall tensil strength, impact resistance, burst strength, tear srength, low temperature strength and flexibility, chemical resistance and dielectric strength. In addition, LLDPE is superior to LCB low density polyethylene in withstanding increased drawdown, which can result in unbalanced film properties and greater production expenses for LCB polyethylene. The charactertistics of LLDPE in providing for a superior balance of mechanical properties in combination with improved film fabrication rheology, distinguishes it as a versatile material having broad utility.

The unique attributes of LLDPE also, however, create difficulties in certain applications, such as film fabrication. For example, LLDPE has limitations in achieving commercially desirable film quality at high film fabrication rates without incurring difficulties, such as, film bubble instability during blown bubble expansion, or draw resonance during melt embossed slot cast or extrusion coating processes.

Solutions to such problems have included mechanical modification in the processes and apparatus used in forming blown film, as disclosed in U.S. Pat. No. 4,330,501 (Jones et al.), involving the modification of cooling fluid flow. Improved extrusion coating processing has been achieved by utilizing blends of LLDPE with LCB low density polyethylenes, as disclosed in U.S. Pat. No. 4,339,507 (Kurtz et al.).

Radiation treatment has been utilized extensively to modify polyolefin rheology. Much of the prior art pertains to radiation treatment of preformed film in order to improve certain mechanical properties. For example, British Pat. No. 2,019,412 (Clarke et al.) pertains to the irradiation of LLDPE film using dosages of between 2 to 80 Mrads, to provide increased elongation at break values. Low level radiation of between 0.05 to 0.25 Mrad, is disclosed in U.S. Pat. No. 3,563,870 (Tung et al.) to improve melt strength and melt extensibility in high density polyethylenes. Low level irradiation has also been disclosed to reduce the melt index and increase the intrinsic viscosity of low crystallinity, LCB low density polyethylenes as set forth in Canadian Pat. No. 788,440 (Sacks et al.). In an article entitled "Crosslinking Effects on Flow of Irradiated Polyolefins," by Markovic et al., in *Modern Plastics*, October 1979, at page 53, involving low level irradiation of polyolefins, including polypropylene, high density polyethylene and various LCB low density polyethylenes, it was noted that such irradiation has a greater effect on absolute viscosity at low shear rates than at high shear rates. Irradiation of polyethylenes in general, however, may often be undesirable in reducing surface properties, such as smoothness, required in various coating applications.

SUMMARY OF THE INVENTION

The present invention relates to polyethylene comprising a low level irradiated, narrow molecular weight distribution, substantially linear, low density copolymer of ethylene and one or more alpha-olefins. Such copolymer has crosslinks to an extent sufficient to provide an increased extensional viscosity and substantially equivalent high shear viscosity when compared with the corresponding noncrosslinked polyethylene. Such copolymer has been subjected to and has absorbed low level, i.e. usually less than about 2 Mrad, ionizing radiation to an extent sufficient to introduce crosslinks into the copolymer but insufficient to produce significant gelation. Such copolymer can be processed into film subsequent to irradiation by extruding a melt containing the irradiated copolymer into a film, and then stretching the film. Mixtures of the crosslinked copolymer and noncrosslinked copolymer are also disclosed.

DETAILED DESCRIPTION OF THE INVENTION

According to the present invention, we have found that increased film fabrication rates and performance for LLDPE film manufacture can be achieved by modification of the chemical structure of LLDPE to provide improved rheology during film extrusion and expansion. The modification of LLDPE is achieved using low level, ionizing radiation to an extent sufficient to introduce crosslinks into the copolymer but insufficient to provide for significant gelation, typically at radiation dosages between 0.05 and 2 Mrad. Such a modification provides for increased extensional viscosity of the LLDPE during film expansion, without a sacrifice in other rheological properties of the resin.

LLDPE Copolymers

Suitable narrow molecular weight distribution, linear, low density ethylene/alpha-olefin copolymers useful in the present invention are substantially free from long chain branching prior to irradiation. The term "linear" is defined as identifying a polymer chain which is predominantly free of long chain branching. "Long chain branching" characterizes branching within polymeric structures which exceeds short branch lengths of pendant groups derived from individual alpha-olefin comonomers. A long chain branch of polyethylene should have at least a sufficient number of carbon atoms to provide significant modifications in rheological behavior, such as caused by chain entanglement. The minimum number of carbon atoms is usually greater than about 100. Short chain branching introduced through comonomer polymerization provides branch lengths of usually less than about 10 carbon atoms per branch. Noncrosslinked LLDPE possesses little, if any, long chain branching such that the only branching to speak of is short chain branching, with such branch length controlled by the pendant chain length of the comonomeric alpha-olefins provided.

The term "narrow molecular weight distribution" as used herein refers to the ratio of weight average molecular weight to number average molecular weight. This ratio can be between 1 and about 10, preferably between about 2 to about 6.5, and most preferably between about 3 to about 5. The lower limit of this ratio is defined by the theoretical limit since number average molecular weight cannot exceed weight average molecular weight by definition. The upper limit of this ratio is reached when the breadth of molecular weight distribution expands to an extent that polymer rheology is not significantly altered by low level irradiation to provide improved film fabrication. The preferred ranges cover LLDPE having narrower molecular weight distributions which can be produced commercially.

LLDPE resins are those copolymers of ethylene and one or more alpha-olefins having at least 3, preferably 4 to around 18, and most preferably 4 to 8, carbon atoms. As such, the term copolymer as used herein is inclusive of terpolymers containing two or more comonomers in addition to ethylene. LLDPE of the present invention will preferably have a major mole percent (greater than about 80%) of ethylene and a minor mole percent (less than about 20%) of one or more other alpha-olefins. Typical olefins include alkyl substituted or unsubstituted mono- or diolefins. Preferred alpha-olefins include butene-1, 4-methyl-penetene-1, hexene-1, heptene-1 octene-1 and 1,4-butadiene. A particularly preferred alpha-olefin is butene-1.

The LLDPE will have a density which is normally not greater than about 0.94 g/cc, and typically from about 0.86 to about 0.93 g/cc. The LLDPE can be made in a solution, slurry or gas phase process using those procedures established in the art.

LLDPE useful in blown film fabrication preferrably has a standard melt index prior to irradiation of between about 0.1 to about 5.0 dg/min, preferably between about 0.5 to about 2.5 dg/min, and most preferably between about 1 to about 2 dg/min. Higher melt index resins up to 10 dg/min and more can be used for other film applications, such as extrusion coating, where properties characterizing low melt index resins are not as essential. Irradiation decreases the melt index of LLDPE. The extent of such a decrease is dependent on the particular LLDPE and the irradiation conditions, as described below.

Irradiation

The conditions under which the LLDPE is irradiated in accordance with the present invention are not critical except with respect to the dosage absorbed by the copolymer. The radiation dosage will vary depending on the degree of sensitivity that the particular LLDPE irradiated possesses with regard to (1) a minimum amount of irradiation necessary to achieve improved film fabrication without (2) undesirable side-effects through, for example, gelation. Usually, the minimum dosage of radiation required in the present invention will be greater than about 0.05, preferably greater than about 0.1, and most preferably greater than about 0.2 Mrad. The maximum radiation dosage will usually be less than 2, preferably less than about 1 and most preferably less than about 0.5 Mrad. The most preferred radiation dosage will usually fall between about 0.2 to about 0.5 Mrad.

In the broadest sense, the radiation dosage should fall within the range of at least a minimum amount sufficient to introduce a degree of crosslinks in the copolymer which improves its film fabrication rheology, up to a maximum amount which is just less than that which would provide for significant gelation of the copolymer. The introduction of crosslinks into the LLDPE can be determined by measuring the amount of long chain branching subsequent to irradiation. The degree of long chain branching may, for example, be established if the number of short chain branches, determined for example by nuclear magnetic resonance spectroscopy, is less than the total numbers of branches present, determined for example by infrared spectroscopy measurement of pendent methyl groups. The term "significant gelation", is used herein to designate the maximum amount of radiation dosage, and is an amount of gel content sufficient to cause: (a) a deterioration in rheological properties, such as a significant increase in high shear viscosity, of the copolymer during film fabrication, or (b) a substantial reduction in the film appearance rating (FAR). FAR is determined by viewing a sample film with the naked eye to note the size and distribution of gels or other foreign particles in comparison to standard film samples having various gel levels. The FAR is rated on a scale of −100 (very poor) to +100 (excellent). A substantial reduction in FAR arises when large gel particles are generated by low level radiation. Gel particles with sizes of less than 250 microns in diameter usually do not give rise to a reduction in FAR. Gel particles between about 250 to 500 microns in size will result in a reduction in FAR at higher particle concentrations. The presence of a measurable amount of gel particles in excess of 500 microns in size will usually cause a substantial reduction in FAR.

Polyethylene compositions of LLDPE irradiated within the limits of the present invention are characterized as substantially free of significant gelation by being substantially soluble in boiling xylene. Significant gelation usually occurs at a gel content of greater than or equal to 1 wt. % of the total polymer. Gel content is preferably less than 0.1 wt. %. The maximum amount of absorbed radiation will vary depending upon the sensitivity of the particular LLDPE to form gel, as well as environmental conditions influencing gelation, such as chemical reactivity to free radicals formed during irradiation by a component in an atmosphere, such as oxygen, in contact with the LLDPE.

The irradiation can be conducted in an air atmosphere but more preferably in the absence of oxygen, such as in a vacuum or in the presence of an inert atmosphere. An inert atmosphere is preferably chemically nonreactive with the irradiated LLDPE and relatively transparent to the irradiation flux. Preferred inert atmospheres contain nitrogen or argon. The irradiation may be performed separately or in combination with other copolymer processing operations, such as in the reactor concurrent with polymerization or in the extruder prior to extrusion.

Radiation dosage is sometimes reported as applied dose; however, this term is misleading because it does not define the amount of radiation actually absorbed by the sample. The radiation dose as defined in the present invention is that amount absorbed, as distinguished from the amount of radiation emitted by a radiation source (measured in Roentgens), and is expressed in megarad (Mrad) units of radiation absorption.

The radiation conditions and procedures can be selected from those well established in the art of polymer irradiation. The source of the ionizing radiation is not critical. For example, electron accelerators can be used to provide high energy electrons, or Cobalt 60 can be used to provide gamma rays. Other sources of ionizing radiation such as X-ray machines and other radioisotopes which emanate gamma rays and other energetic rays and particles may also be used. Commercial electron accelerators are particularly useful for the purposes of this invention. These devices usually operate in the voltage range from 0.5 M.E.V. to 3 M.E.V. and at bean powers from 500 to 100,000 watts. Cobalt 60 sources for industrial processing vary in strength from a few thousand Curies to over 1 million Curies.

The term ionizing radiation includes accelerated electrons, and other particles and electromagnetic radiation having a wave length less than about 250 Angstroms. When ionizing radiation is absorbed by matter, sufficient energy is transferred to the material so that orbital electrons are ejected from atoms. This charge separation, i.e. ionization, produces chemical changes such as chain cleavage and crosslinks in polymers.

Exposure of LLDPE to ionizing radiation can be conducted by continuously passing the copolymer through a radiation field at a speed such that the residence time in the field is sufficient for the copolymer to absorb the desired dosage.

LLDPE can be irradiated as a solid or a melt, i.e. in molten form, at any time from copolymer formation up until extrusion of the copolymer into a film. The copolymer can be irradiated as a solid during or subsequent to polymerization, such as in a fluidized bed, or as a melt in the extruder prior to or at extrusion. As a particulate solid the copolymer can be irradiated in either granular or pelleted form.

In some instances, after the LLDPE has been irradiated it may be mechanically worked to improve its optical properties, i.e., to reduce its haze value and increase gloss and specular transmission. Mechanical shearing action, such as homogenizing in a mixer, at temperatures below the melting point of the resin, can be used. Such a homogenized LLDPE is easier to extrude in tubular form, and has improved gloss and clarity. The mechanical working can be achieved using well established procedures in the art. Mechanical working should be conducted below level at which the extensional viscosity or other rheological properties of the irradiated LLDPE are reduced by such working.

Extrusion

Low level irradiated LLDPE can be extruded into film using conventional procedures well established in the art of film fabrication, such as blown film extrusion, extrusion coating, embossing of slot cast extrusion techniques. Such techniques are described in, for example, U.S. Pat. No. 4,243,619 (Fraser et al.) which is incorporated herein by reference.

The present invention provides a process for producing film comprising: (a) irradiating LLDPE with low level, ionizing radiation to an extent sufficient to introduce crosslinks into the LLDPE but insufficient to provide for significant gelation, followed by (b) extruding a melt containing the irradiated LLDPE into a film; and (c) stretching the film. In one embodiment, the film extruded in step (b) is in tubular form, with the tubular film being stretched in step (c) using blown bubble expansion. In other embodiments the film extrusion in step (b) is (1) slot cast extrusion producing a flat film or (2) extrusion coating producing a film coating on a substrate. In a preferred embodiment, the irradiated LLDPE from step (a) is (d) blended with nonirradiated LLDPE prior to extrusion step (b). Alternatively, or in addition to blending step (d), a proportion of irradiated to nonirradiated LLDPE is produced by irradiating only a portion of LLDPE during step (a).

LLDPE Compositions

In a preferred embodiment, LLDPE compositions of irradiated LLDPE and the same or different nonirradiated LLDPE are provided. The term "nonirradiated" of course includes normal background radiation from the environment. Polyethylene compositions of the present invention comprising a low level irradiated LLDPE may contain additional materials including other resins, such as LCB low density or high density polyethylenes. LLDPE compositions of irradiated and nonirradiated LLDPE have been found to provide enhanced fabrication rates which exceed the values linearly extrapolated from the fabrication rates for nonirradiated and 100% irradiated LLDPE based on weight percent. The preferred LLDPE compositions may contain from about 1 to about 95%, preferably from about 5 to about 30%, and most preferably from about 10 to about 25% irradiated LLDPE. LLDPE compositions having only a portion of irradiated LLDPE may be provided as blends or by adjusting the dosage during irradiation to irradiate only the desired portion of resin thereby avoiding or minimizing subsequent blending procedures with nonirradiated LLDPE. When irradiated LLDPE is blended with a different, nonirradiated LLDPE, it is preferred that the LLDPE which is irradiated has a melt index before irradiation which is less than the melt index of the nonirradiated LLDPE.

In a typical embodiment, LLDPE absorbs a dose of irradiation up to about 1 Mrad. The irradiated LLDPE is then blended with a nonirradiated LLDPE and fed into an extruder. The blend is heated to form a melt and is extruded through a die forming a film or web. The film is then stretched or expanded using, for example, a blown bubble in tubular film extrusion, or drawdown in extrusion coating, embossing or slot cast extrusion.

Film

The film produced by the process of the present invention usually has a thickness from about 0.1 to about 20 mils, preferably from about 0.1 to about 10 mils, and most preferably from about 0.1 to about 6 mils. The most preferred film is characterized by the following properties: a puncture resistance value of greater than about 7.0 in-lbs/mil; and ultimate elongation of greater than about 400%; a tensile impact strength of within about 400 to about 2000 ft-lbs/in³; and a tensile strength of greater than about 2000 to about 7000 psi.

In accordance with conventional practice, the film may contain well known additives such as slip agents, anti-block compounds, colorants, antioxidants, stabilizers, fillers, nucleating agents and the like. In extrusion coating procedures, the film may contain additional conventional additives such as chill roll release agents, and may be extruded directly onto a variety of common substrates, and as polyethylene, paper, aluminum foil and the like.

Such films are useful in a wide variety of applications typical of LLDPE such as packaging materials including bags, shrink wrap, and the like; as well as laminates.

Irradiated LLDPE Copolymer Rheology

Comparing rheologies of crosslinked with noncrosslinked LLDPE shows the effect low level irradiation has on film fabrication performance. In film extrusion, at least two aspects of rheological behavior are important; namely extension and shear.

Extension may be biaxial, as in the film blowing process, or approximately planar as in other free surface stretching flows such as extrusion coating or slot-cast processing. An approximation of extensional rheology can be made by measuring extensional viscosity. Extensional viscosity is defined as the ratio of normal stress over strain rate as follows:

$$\eta_E = \pi/\dot{\epsilon} \tag{I}$$

wherein $\eta_E$ is the extensional viscosity, in poise; $\pi$ is the normal stress, in dynes/cm²; and $\dot{\epsilon}$ is the strain rate, in sec⁻¹.

Extensional viscosity can be measured by a number of experimental techniques. In the present application, extensional viscosity is measured in a deformation field of uniaxial stretching using a constant strain rate method. The method uses a tensile testing machine in which the ends of a molten ring of polymer are held in jaws, immersed in a silicone oil bath, and separated at an accelerating rate according to the following relationship:

$$L(t) = L_0 e^{\dot{\epsilon}t} \tag{II}$$

wherein L(t) is the jaw separation at time t (in sec); $L_0$ is the initial jaw separation; and $\dot{\epsilon}$ is the strain rate (in sec⁻¹), which is kept constant. A force transducer measures the load during deformation. This load force is divided by the approximate current cross-sectional area to give the normal stress value. Extensional viscosity can then be calculated using Formula I by dividing the normal stress by the strain rate, and is determined as a function of displacement or time during the deformation, at a temperature of about 150° C.

Figure 1:
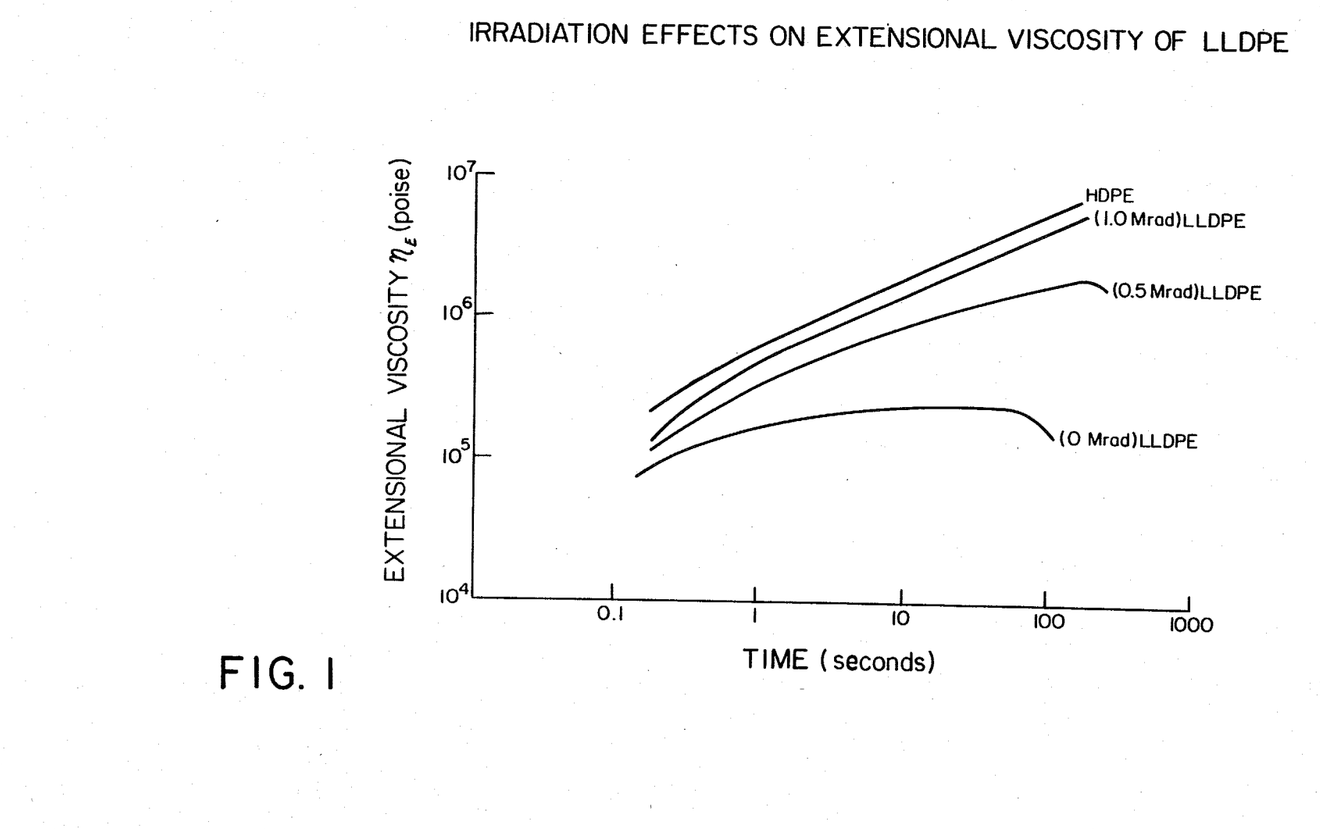
FIG. 1 is a graphic representation illustrating the irradiation effects on extensional viscosity of LLDPE.

Using this technique, the extensional viscosity of nonirradiated versus low level irradiated LLDPE can be compared, as set forth in FIG. 1. We have discovered that low level irradiation of LLDPE produces qualitatively significant increases in extensional viscosity. In FIG. 1, the short times of from 0.1 to 1 second correspond to approximately 1 sec⁻¹ strain rate and the long times of greater than 10 seconds correspond to approximately 0.01 sec⁻¹ strain rates. As such, the increase in extensional viscosity is greatest at relatively low strain rates typical in such processes as tubular blown film fabrication. For comparative purposes, the extensional viscosity of a high density polyethylene (HDPE) is provided. At the higher radiation dosages, the extensional viscosity of low level irradiated LLDPE is similar to the extensional viscosity of HDPE indicating that conventional film fabrication equipment and procedures used in HDPE film production, may be used with the irradiated LLDPE of the present invention to achieve a better balance of film properties.

Shear rheology is also important in film extrusion particularly when a polymer melt passes through an extrusion die undergoing severe shearing deformation. Shear rheology can be measured using shear viscosity. Shear viscosity is defined as the ratio of shear stress over shear rate as follows:

$$\eta_S = \tau/\dot{\gamma} \tag{III}$$

wherein $\eta_S$ is the shear viscosity, in poise; $\tau$ is the shear stress, in dynes/cm²; and $\dot{\gamma}$ is the shear rate, in sec.⁻¹.

Figure 2:
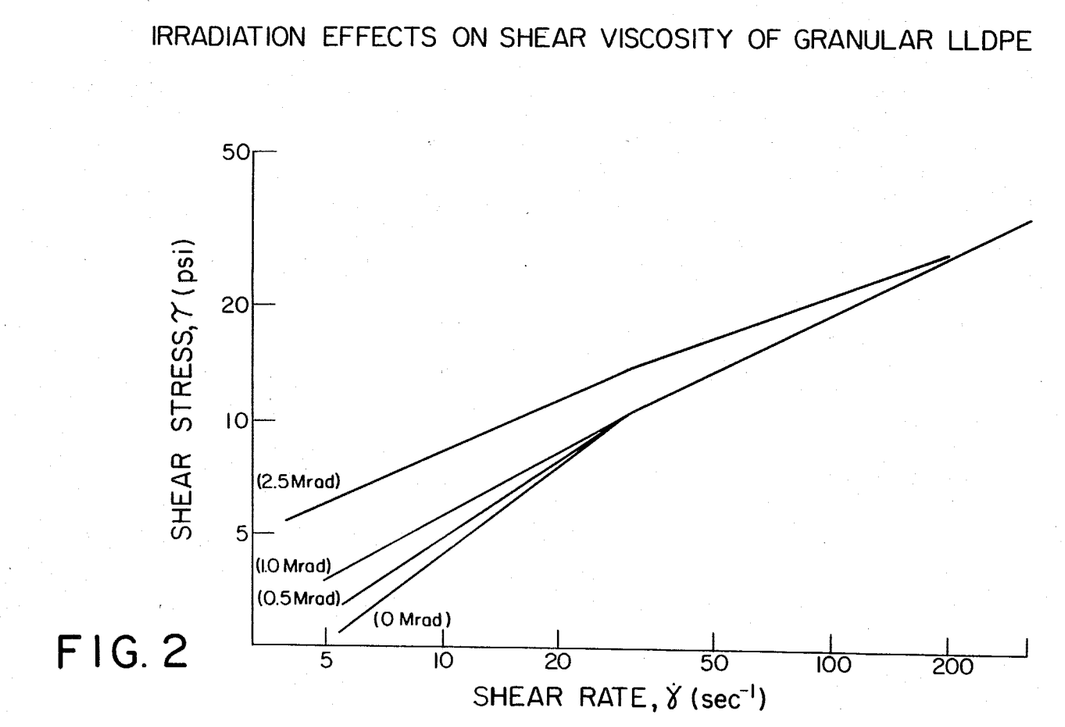
FIG. 2 is a graphic representation illustrating the irradiation effects on shear viscosity of granular LLDPE.
Figure 3:
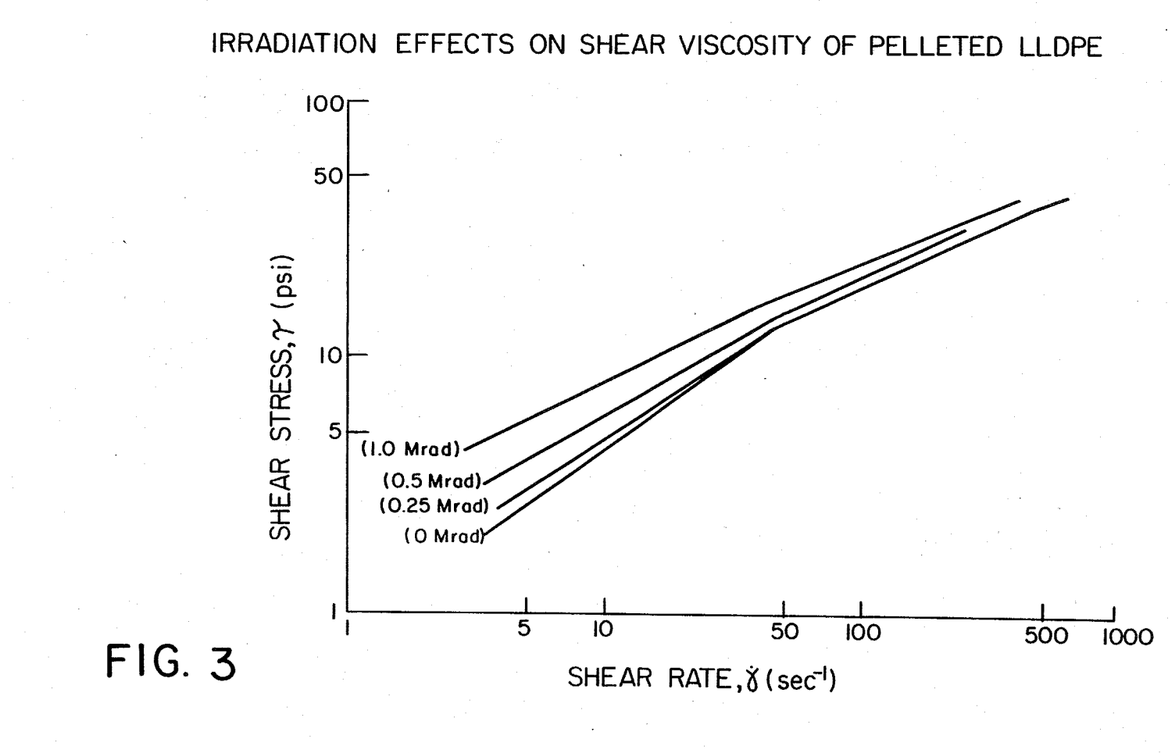
FIG. 3 is a graphic repesentation illustrating the irradiation effects on shear viscosity of pelleted LLDPE.

FIGS. 2 and 3 set forth the shear viscosities of granular and pelleted LLDPE respectively, for different radiation dosages. As can be seen, low shear rate rheology is strongly affected by LLDPE irradiation, whereas high shear rate rheology remains relatively unchanged, particularly at the lower radiation dosages. For radiation dosages up to 0.5 Mrad for pelleted LLDPE and up to 1 Mrad for granular LLDPE, the high shear rate remains substantially unchanged. Since increases in shear stress at high shear rates causes an undesirable increase in extruder power and elevation in melt temperature for equivalent fabrication rates, this attribute of low level irradiated LLDPE in providing increased extensional rheology without sacrificing shear viscosity under high shear rate extrusion conditions is highly beneficial in establishing improved film fabrication.

Low level irradiation of LLDPE produces crosslinks to an extent sufficient for the LLDPE to exhibit increased extensional viscosity, while maintaining a substantially equivalent high shear viscosity when compared with the corresponding noncrosslinked LLDPE. At a strain rate of 0.1 sec⁻¹ and a strain of 1, at 150° C., the low level irradiated LLDPE of the present invention will exhibit an increase in extensional viscosity of greater than about 20%, preferably greater than about 50%, and most preferably greater than about 100%. At a shear rate of 200 sec⁻¹, at 210° C., such low level irradiated LLDPE maintains a substantially equivalent high shear viscosity of less than around 20%, preferably less than 10%, and most preferably less than about 5% above the corresponding high shear viscosity for the noncrosslinked form of LLDPE.

Figure 4:
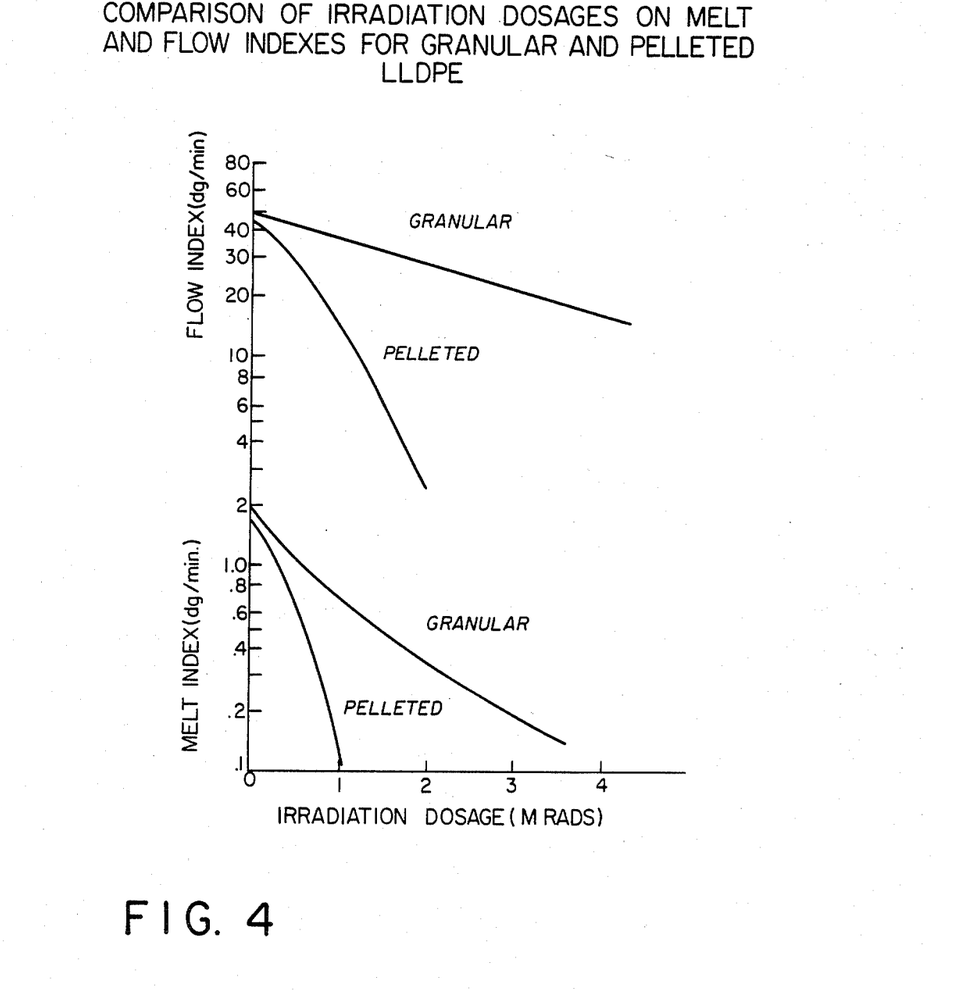
FIG. 4 is a graphic representation illustrating a comparison of irradiation dosage on melt and flow indexes for granular and pelleted LLDPE.

We have discovered that the form of the LLDPE during low level irradiation influences the rheological modifications. LLDPE is produced, using for example a fluidized bed gas phase polymerization, as a small, particulate, relatively porous, solid referred to herein as in granular form. Granular LLDPE can, however, then be processed by melt pelletizing with the resin undergoing melting and shearing in a compounding extruder or pump to produce a modified form referred to herein as pelleted. The processed, pelleted form differs from the unprocessed granular form in that the former resin is (1) less porous, i.e., has a lower surface area to volume ratio, therefore having greater density, and (2) differs on a molecular level in possessing more chain entanglements than the unprocessed, granular form. FIGS. 2 and 3 demonstrate that the LLDPE has a greater capacity to absorb higher levels of irradiation without increases in high shear viscosity when in granular, as opposed to pelleted, form. In contrast, as shown in FIG. 4, although both granular and pelleted LLDPE show a decrease in melt and flow indexes with increases in dosage, the pelleted form has significantly greater decreases than the granular form. This distinction provides superior increase in bubble stability during tubular film blowing processes for low level irradiated, pelleted versus granular LLDPE at equivalent dosages. As a consequence, the form of the LLDPE irradiated can be selected to optimize either absorption capacity or maximum rheological change depending on which property is more desirable for the particular LLDPE utilized.

Molecular weight analysis, as shown in Examples 36–46, indicates additional distinctions between low level irradiation of pelleted and granular LLDPE since there is a definite, pronounced increase in molecular weight values for low level irradiated, pelleted LLDPE, but there is either no change in or an apparent, slight decrease in molecular weight values for low level irradiated, granular LLDPE.

Figure 5:
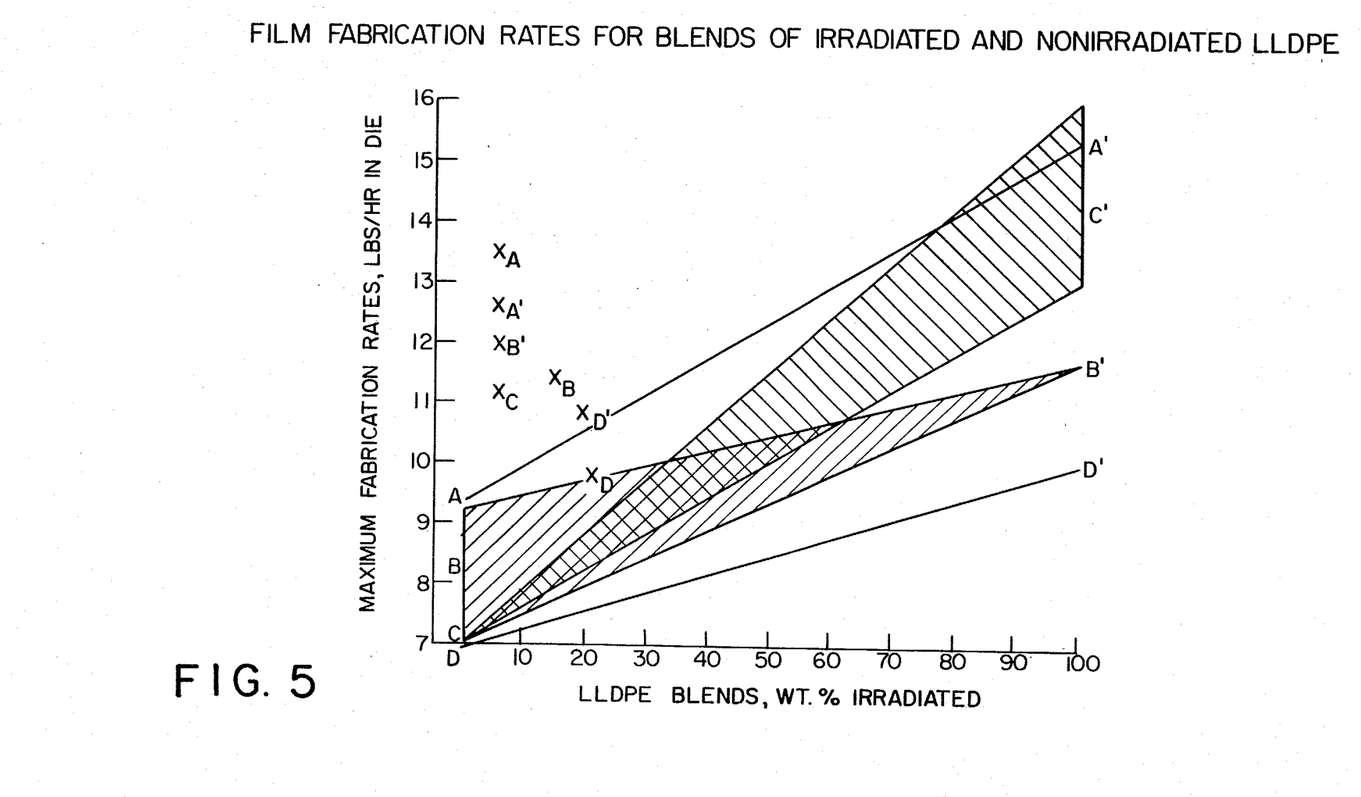
FIG. 5 is a graphic representation illustrating film fabrication rates for irradiated and nonirradiated LLDPE and blends of such materials.

We have also discovered that LLDPE compositions containing relatively low proportions of preferably less than 30 weight percent irradiated LLDPE with nonirradiated LLDPE provide dramatic increases in film fabrication rates. These increases are significantly greater than that which would be expected for combinations of the two resins. FIG. 5 provides a graphic representation of these highly advantageous increases in film fabrication rates. Under four different film fabrication conditions, the maximum fabrication rates of the nonirradiated LLDPE (identified by points, A, C, D and range B) are compared to the maximum fabrication rates of 100% irradiated LLDPE (identified by points A', B', D' and range C'). The maximum fabrication rates lying between these values (shown by lines A—A', D—D', and shaded areas B—B' and C—C') signify the range of values which would be expected absent a synergistic combination effect of the irradiated-nonirradiated LLDPE composition. The maximum fabrication rate values for irradiated-nonirradiated LLDPE compositions are plotted (at the "X" values with subnotations identifying the corresponding fabrication conditions). As can be seen, the fabrication rates of these LLDPE mixtures greatly surpass the corresponding anticipated values, providing substantially improved fabrication rates despite the relatively minor percentages of irradiated LLDPE present. The commercial advantages of such significant increases in film fabrication rates, along with savings on the processing costs of irradiating only a portion of the LLDPE used are quite significant.

Without wishing to be bound to any particular theory, we believe that low level irradiation of LLDPE introduces crosslinks in the form of long chain branching producing star shaped molecules from the joining of free radicals on adjacent polymer chains. Such molecules are believed to provide greater chain entanglement than the "T" shaped molecules in low level irradiated, conventional LCB, low density polyethylenes, a large proportion of which have branches too short to produce chain entanglement. Furthermore, the absence of a high molecular weight tail and the greater proportion of tertiary carbon atoms at short chain branch sites in LLDPE are believed to provide (1) a lower sensitivity to intramolecular crosslinking (than the bigger, high molecular weight tail LCB molecules) minimizing gelation, as well as (2) a higher degree of crosslinking (than conventional LCB polyethylene having fewer short chain branches).

We therefore believe LLDPE copolymers have a unique capacity for achieving desirable low level radiation induced molecular changes, distinct from a simple change in molecular weight, when compared with conventional LCB low density polyethylene.

EXAMPLES

The following Examples illustrate the processes and products of the present invention and are not intended as a limitation in the scope thereof.

Irradiation Procedure

LLDPE was irradiated, to the dose set forth in the examples, based on the following procedure using a 2,000,000 volt, 500 watt, van de Graaf electron accelerator. This accelerator was equipped with a beam scanner which oscillated the electron beam at a rate of 200 hertz at right angles to the direction of travel of the LLDPE. The LLDPE was exposed to the electron beam while moving on a stainless steel conveyor belt three inches below the exit window. The LLDPE was fed onto the conveyor using a vibrating feeder attached to a storage hopper. The width of the LLDPE bed passing under the beam was controlled to between eight and twelve inches, depending on the production rate desired. The beam scan width was adjusted so that the entire bed width was irradiated. The bed depth was adjusted so that equal entrance and exit doses, with respect to the resin plane through which the irradiation passes, were delivered. The electron accelerator was operated at 2,000,000 volts and at beam currents between 100 microamperes and 250 microamperes, depending on the absorbed dose. The conveyor belt speed varied from ten inches per minute to about five hundred inches per minute or higher. The various absorbed doses were obtained by various combinations of beam current, beam scan width and product flow rates, as well as the geometry of product flow. Width of product flow was adjusted with respect to the beam scan width to achieve a 90% edge absorption efficiency. The bed depth was adjusted to obtain depth absorption efficiencies of 90%. The actual bed depth was determined by the bulk density of the particulate polymer and the equal entrance-exit dose requirement. The maximum dose between the entrance and exit planes was higher than the equal entrance-exit doses by about 40%. The average dose for the total resin bed was about 30% higher. The absorbed dosage set forth in the Examples is the entrance-exit dosage. The conveyor belt and the feed hopper were continuously purged with nitrogen gas.

Extrusion Procedure

LLDPE film was produced using the following procedures. The LLDPE was loaded into an extruder hopper and dropped by gravity into the feed section of a plasticizing extruder. The LLDPE was conveyed, melted, pressurized and pumped through an annular die as a substantially homogeneous melt.

In tubular blown film fabrication, internal air pressure expands the bubble in the melt to a blow up ratio (BUR) fixed for a given run. The film is cooled by an air ring and drawn through take off rolls which control take off speed as well as the downstream seal for the bubble. The film is then wound onto a roll with samples taken from the rolled product.

The extrusion coating Examples 52-54 were conducted using a 2½ inch extruder having a barrel length to diameter of 27 to 1 and a 24 to 1 length to diameter ratio polyethylene screw was employed. The extruder had a 50 horsepower dynamatic drive and 5 barrel heating zones. An end fed, 12 inch semi-coathanger type die was employed, having a final land length of ¾ inch, and a die-gap setting of approximately 20 mils. The coating unit had a laminating station 28 inches wide and included a payoff roll, a preheat drum, a chill roll and windup roll. Extrusion rates were controlled by RPM settings of the extruder. Coating thickness was controlled by the line speed of the coating unit. The extruder barrel settings were between 500° F. and 600° F., typically about 600° F. LLDPE was extruded using the following extrusion coating conditions: substrate-40 lb. kraft paper; die temperature-600° F. nip pressure (lbs/lineal inch)-100; lead in (inches)-0; draw span (inches)-3; coating speed (ft/min)-as indicated; coating thickness (mils)-1.5; chill roll water temp. (°F.)-55; chill roll water flow (gpm)-90; and percent of screw cooled-neutral.

Definitions and Testing Procedures

The shorthand designations in the following examples are based on the definitions given in the following table.

| Designation | Description |
|---|---|
| LLDPE A | A linear, low density ethylene/butene-1 copolymer in granular form, having a melt index of 2 dg/min, and a density of 0.918. |
| HDPE A | A high density polyethylene having a melt index of 0.2 dg/min. |
| LLDPE B | LLDPE A in pelleted form. |
| LLDPE C | A linear, low density ethylene/butene-1 copolymer in granular form having a melt index of 20 dg/min. |
| LLDPE D | A linear, low density ethylene/butene-1 copolymer in granular form having a melt index of 1 dg/min. |
| MD | Machine direction. |
| TD | Transverse direction. |

Test procedures for analyzing rheological and film properties were based on the following methods:

Dart Drop Impact Strength: ASTM D-1709 (gms/mil).

Elmendorf Tear Strength: ASTM D-1922 (gms/mil).

Film Haze: ASTM D-1003-61 (percent haze).

Flow Index (FI): ASTM D-1238-Condition F (dg/min).

Maximum Fabrication Rate: Measured as the maximum stable (tubular blown) film rate that can be achieved on a given extruder using cooling air, without any additional film supports except for guides and a collapsing frame, using a given die (measured as mass output per unit length of die circumference).

Melt Flow Ratio (MFR): Flow Index/Melt Index.

Melt Index (MI): ASTM D-1238-Condition E (dg/min).

Puncture Resistance: ASTM D-1922 (in-lbs/mil).

Tensile Impact Strength: ASTM D 1822 (ft-lbs$^3$/in).

Tensile Strength and Elongation: ASTM D-882 (%).

45° Specular Gloss: ASTM D-2457-70.

Shear Stress: Measurements were made using a capillary rheometer by the pressure drop across the capillary times the diameter of the capillary divided by four times the capillary length (psi).

Shear Rate: Based on apparent shear rate, which is four times the volumetric flow rate divided by pi times the radius of the capillary to the third power (sec$^{-1}$).

Both shear stress and shear rate measurements were conducted based on procedures disclosed in the prior art, as in Cogswell, *Polymer Melt Rheology*, Halstead Press, 1981, page 31.

RHEOLOGY ANALYSIS (EXAMPLES 1-46)

Example 1-24: Extensional Viscosity, $\eta_E$

Using the irradiation and rheology testing procedures set forth above, the extensional viscosity was analyzed comparing nonirradiated with irradiated (at varying dosages) LLDPE A. The extensional viscosity of HDPE A was also tested for comparison. The experimental results are set forth in Tables 1 through 4. FIG. 1 was tabulated as a result of linear extrapolation of the average values set forth in Examples 1 through 24.

TABLE 1

Extensional Viscosity, $\eta_E$, of Nonirradiated LLDPE A

| Example 1[a] | | Example 2[a] | | Example 3[b] | | Example 4[b] | | Example 5[c] | | Example 6[c] | |
|---|---|---|---|---|---|---|---|---|---|---|---|
| Time, (sec) | $\eta_E$, ($10^5$poise) | Time, (sec) | $\eta_E$, ($10^5$poise) | Time, (sec) | $\eta_E$, ($10^5$poise) | Time, (sec) | $\eta_E$, ($10^5$poise) | Time, (sec) | $\eta_E$, ($10^5$poise) | Time, (sec) | $\eta_E$, ($10^5$poise) |
| 0.16 | 0.85 | 0.16 | 0.92 | 0.92 | 1.4 | 0.92 | 1.3 | 9.2 | 2.1 | 9.2 | 2.5 |
| 0.31 | 1.3 | 0.31 | 1.4 | 1.8 | 1.9 | 1.8 | 1.8 | 18 | 2.6 | 18 | 2.4 |
| 0.38 | 1.5 | 0.38 | 1.5 | 2.5 | 2.0 | 2.5 | 2.0 | 33 | 2.7 | 33 | 2.6 |
| 0.44 | 1.5 | 0.44 | 1.6 | 3.3 | 2.1 | 3.3 | 2.1 | 46 | 2.7 | 46 | 2.4 |
| 0.56 | 1.6 | 0.56 | 1.7 | 4.6 | 2.1 | 4.6 | 2.1 | 57 | 2.5 | 57 | 2.3 |
| 0.76 | 1.7 | 0.76 | 1.8 | 6.8 | 2.2 | 6.8 | 2.3 | 68 | 2.5 | 68 | 2.6 |
| 0.93 | 1.8 | 0.93 | 1.9 | 10 | 2.0 | 10 | 2.1 | 86 | 2.3 | 86 | 2.4 |
| 1.0 | 1.9 | 1.0 | 2.0 | 14 | 1.9 | 14 | 2.2 | 100 | 1.8 | 100 | 1.8 |
| 1.6 | 2.1 | 1.6 | 2.1 | 16 | 1.9 | 16 | 2.1 | 140 | 1.0 | 140 | 1.0 |
| 1.9 | 2.1 | 1.9 | 2.0 | 19 | 1.8 | 19 | 2.1 | 160 | 0.68 | 160 | 0.84 |
| 2.2 | 2.0 | 2.2 | 1.5 | 22 | 1.3 | 22 | 1.6 | | | | |

[a] constant strain rate at around 1 sec$^{-1}$
[b] constant strain rate at around 0.1 sec$^{-1}$
[c] constant strain rate at around 0.01 sec$^{-1}$

TABLE 2

Extensional Viscosity, $\eta_E$, of 0.5 Mrad LLDPE A

| Example 7[a] | | Example 8[a] | | Example 9[b] | | Example 10[b] | | Example 11[c] | | Example 12[c] | |
|---|---|---|---|---|---|---|---|---|---|---|---|
| Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) |
| 0.21 | 1.3 | 0.18 | 1.1 | 1.8 | 4.1 | 1.6 | 3.2 | 9.2 | 5.4 | 9.2 | 5.6 |
| 0.35 | 2.0 | 0.33 | 1.8 | 3.3 | 5.9 | 3.1 | 5.2 | 18 | 9.9 | 18 | 9.0 |
| 0.48 | 2.5 | 0.46 | 2.3 | 3.9 | 6.4 | 3.8 | 5.6 | 25 | 12 | 25 | 11 |
| 0.54 | 2.6 | 0.52 | 2.4 | 4.6 | 6.8 | 4.4 | 6.0 | 33 | 14 | 33 | 11 |
| 0.59 | 2.7 | 0.57 | 2.5 | 5.7 | 7.5 | 5.6 | 6.6 | 46 | 15 | 46 | 13 |
| 0.70 | 2.9 | 0.68 | 2.8 | 6.8 | 8.0 | 6.7 | 7.1 | 57 | 16 | 57 | 14 |
| 1.0 | 3.6 | 1.0 | 3.5 | 10 | 9.3 | 10 | 8.4 | 68 | 17 | 68 | 15 |
| 1.4 | 4.0 | 1.4 | 3.9 | 16 | 11 | 16 | 9.8 | 100 | 18 | 100 | 16 |
| 1.6 | 4.2 | 1.6 | 4.1 | 19 | 13 | 19 | 11 | 160 | 20 | 160 | 19 |
| 1.9 | 2.5 | 1.9 | 3.0 | 22 | 10 | 22 | 9.1 | 190 | 24 | 190 | 22 |
| 2.2 | 0.78 | 2.2 | 1.1 | 24 | 2.8 | 24 | 5.1 | 220 | 18 | 220 | 17 |

[a] constant strain rate at around 1 sec$^{-1}$
[b] constant strain rate at around 0.1 sec$^{-1}$
[c] constant strain rate at around 0.01 sec$^{-1}$

TABLE 3

Extensional Viscosity, $\eta_E$, of 1 Mrad LLDPE A

| Example 13[a] | | Example 14[a] | | Example 15[b] | | Example 16[b] | | Example 17[c] | | Example 18[c] | |
|---|---|---|---|---|---|---|---|---|---|---|---|
| Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) |
| 0.19 | 1.5 | 0.18 | 1.5 | 1.8 | 6.2 | 1.8 | 6.0 | 9.2 | 13 | 9.2 | 11 |
| 0.34 | 2.4 | 0.33 | 2.5 | 3.3 | 9.2 | 3.3 | 9.4 | 18 | 20 | 18 | 19 |
| 0.47 | 3.2 | 0.46 | 3.2 | 3.9 | 10 | 3.9 | 10 | 25 | 25 | 25 | 24 |
| 0.58 | 3.6 | 0.52 | 3.4 | 4.6 | 10 | 4.6 | 11 | 33 | 28 | 33 | 27 |
| 0.69 | 3.9 | 0.57 | 3.6 | 5.7 | 12 | 5.7 | 12 | 46 | 32 | 46 | 31 |
| 0.78 | 4.3 | 0.68 | 3.9 | 6.8 | 13 | 6.8 | 13 | 57 | 34 | 57 | 33 |
| 0.94 | 4.7 | 0.86 | 4.5 | 10 | 16 | 10 | 16 | 68 | 37 | 68 | 37 |
| 1.0 | 5.2 | 1.0 | 5.2 | 14 | 18 | 14 | 18 | 94 | 43 | 94 | 42 |
| 1.6 | 6.7 | 1.6 | 6.6 | 16 | 20 | 16 | 20 | 100 | 44 | 100 | 43 |
| 1.9 | 7.6 | 1.8 | 4.8 | 18 | 22 | 17 | 21 | 140 | 50 | 140 | 49 |
| | | | | 19 | 23 | 18 | 21 | 160 | 54 | 160 | 54 |

[a] constant strain rate at around 1 sec$^{-1}$
[b] constant strain rate at around 0.1 sec$^{-1}$
[c] constant strain rate at around 0.01 sec$^{-1}$

TABLE 4

Extensional Viscosity, $\eta_E$, of (Nonirradiated) HDPE A

| Example 19[a] | | Example 20[a] | | Example 21[b] | | Example 22[b] | | Example 23[c] | | Example 24[c] | |
|---|---|---|---|---|---|---|---|---|---|---|---|
| Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) | Time, (sec) | $\eta_E$, ($10^5$ poise) |
| 0.18 | 2.4 | 0.18 | 1.9 | 1.6 | 6.8 | 1.8 | 7.7 | 9.2 | 17 | 9.2 | 14 |
| 0.33 | 3.6 | 0.33 | 3.3 | 2.4 | 9.4 | 2.5 | 10 | 18 | 27 | 18 | 24 |
| 0.39 | 4.2 | 0.39 | 3.8 | 3.1 | 11 | 3.3 | 11 | 33 | 37 | 33 | 34 |
| 0.46 | 4.5 | 0.46 | 4.1 | 4.4 | 13 | 4.6 | 14 | 46 | 43 | 46 | 39 |
| 0.57 | 5.0 | 0.57 | 4.7 | 5.6 | 15 | 5.7 | 16 | 57 | 47 | 57 | 44 |
| 0.68 | 5.6 | 0.68 | 5.3 | 6.7 | 17 | 6.8 | 18 | 68 | 52 | 68 | 47 |
| 0.77 | 6.1 | 0.77 | 5.7 | 7.6 | 18 | 7.7 | 19 | 77 | 57 | 77 | 50 |
| 0.86 | 6.6 | 0.86 | 6.1 | 9.3 | 20 | 9.4 | 21 | 94 | 61 | 94 | 52 |
| 1.0 | 7.5 | 1.0 | 6.9 | 10 | 20 | 10 | 21 | 100 | 64 | 100 | 53 |
| 1.4 | 7.8 | 1.4 | 4.7 | 14 | 21 | 14 | 23 | 140 | 65 | 140 | 49 |
| 1.4 | 6.3 | 1.4 | 1.8 | 17 | 18 | 15 | 22 | 150 | 53 | 140 | 45 |

[a] constant strain rate at around 1 sec$^{-1}$
[b] constant strain rate at around 0.1 sec$^{-1}$
[c] constant strain rate at around 0.01 sec$^{-1}$

Examples 25-32: Shear Viscosity, $\eta_s$

Using the irradiation procedures and rheology tests set forth above, the shear stress and shear rate values were determined for LLDPE in granular and pelleted form, using varying levels of irradiation. The results are set forth in Tables 5 and 6, for granular and pelleted resin forms respectively. FIGS. 2 and 3 present linear compilations of these shear values using logarithmic scaling.

TABLE 5

Shear Viscosity of (Granular) LLDPE A

| Example 25 (0 Mrad) | | Example 26 (0.5 Mrad) | | Example 27 (1.0 Mrad) | | Example 28 (2.5 Mrad) | |
|---|---|---|---|---|---|---|---|
| Shear Stress, (psi) | Shear Rate, (sec$^{-1}$) | Shear Stress, (psi) | Shear Rate, (sec$^{-1}$) | Shear Stress, (psi) | Shear Rate, (sec$^{-1}$) | Shear Stress, (psi) | Shear Rate, (sec$^{-1}$) |
| 3.56 | 7.35 | 4.22 | 8.15 | 3.69 | 4.78 | 5.34 | 3.85 |
| 6.20 | 15.5 | 7.12 | 15.9 | 7.52 | 17.0 | 10.42 | 16.2 |

TABLE 5-continued

Shear Viscosity of (Granular) LLDPE A

| Example 25 (0 Mrad) | | Example 26 (0.5 Mrad) | | Example 27 (1.0 Mrad) | | Example 28 (2.5 Mrad) | |
| --- | --- | --- | --- | --- | --- | --- | --- |
| Shear Stress, (psi) | Shear Rate, (sec$^{-1}$) | Shear Stress, (psi) | Shear Rate, (sec$^{-1}$) | Shear Stress, (psi) | Shear Rate, (sec$^{-1}$) | Shear Stress, (psi) | Shear Rate, (sec$^{-1}$) |
| 10.2 | 18.6 | 10.3 | 30.3 | 10.8 | 31.7 | 13.58 | 29.0 |
| 14.1 | 51.7 | 13.7 | 47.8 | 14.4 | 53.0 | 17.54 | 52.0 |
| 17.1 | 75.8 | 16.6 | 71.3 | 17.1 | 65.0 | 20.17 | 70.9 |
| 20.0 | 100.5 | 19.5 | 97.5 | 20.2 | 98.2 | 21.82 | 99.8 |
| 22.2 | 120.4 | 21.9 | 119.4 | 22.2 | 121.3 | 23.60 | 114 |
| 24.4 | 150.9 | 24.0 | 142.5 | 24.3 | 163.7 | 25.7 | 158 |
| 26.0 | 170.5 | 26.1 | 169.8 | 26.2 | 171.7 | 27.0 | 175 |
| 28.0 | 210.6 | 27.7 | 208.0 | 28.3 | 215.7 | 28.3 | 205 |
| 30.7 | 244.6 | 30.3 | 286.2 | 30.3 | 255.2 | | |
| | | 33.0 | 331.6 | 34.3 | 331.6 | | |
| | | 37.6 | 471.2 | 38.2 | 456.5 | | |

TABLE 6

Shear Viscosity of (Pelleted) LLDPE B

| Example 29 (0 Mrad) | | Example 30 (0.25 Mrad) | | Example 31 (0.5 Mrad) | | Example 32 (1.0 Mrad) | |
| --- | --- | --- | --- | --- | --- | --- | --- |
| Shear Stress, (psi) | Shear Rate, (sec$^{-1}$) | Shear Stress, (psi) | Shear Rate, (sec$^{-1}$) | Shear Stress, (psi) | Shear Rate, (sec$^{-1}$) | Shear Stress, (psi) | Shear Rate, (sec$^{-1}$) |
| 2.57 | 4.53 | 3.43 | 5.46 | 4.22 | 5.30 | 5.54 | 4.38 |
| 6.59 | 16.21 | 6.72 | 15.58 | 8.31 | 17.68 | 10.68 | 16.77 |
| 10.28 | 30.83 | 10.28 | 30.71 | 12.00 | 32.36 | 14.90 | 30.21 |
| 14.11 | 53.29 | 14.24 | 51.68 | 15.56 | 51.59 | 18.99 | 53.22 |
| 16.94 | 73.81 | 17.14 | 71.73 | 18.72 | 73.40 | 22.28 | 74.65 |
| 20.04 | 99.52 | 20.44 | 100.8 | 22.15 | 100.6 | 25.32 | 98.17 |
| 22.28 | 127.0 | 22.42 | 122.1 | 24.26 | 122.9 | 27.69 | 125.4 |
| 24.26 | 151.0 | 27.03 | 184.3 | 26.37 | 147.3 | 29.67 | 147.5 |
| 26.37 | 183.9 | 29.80 | 236.0 | 29.01 | 182.8 | 32.04 | 177.8 |
| 29.34 | 240.6 | 32.96 | 294.2 | 31.91 | 238.7 | 35.60 | 231.5 |
| 33.95 | 336.0 | 37.18 | 406.9 | | | 40.22 | 328.9 |
| | | 40.88 | 522.6 | | | | |
| | | 42.19 | 577.1 | | | | |

Examples 33–35: Melt-Flow Index Measurements

Using the irradiation procedures and rheology tests set forth above, three types of LLDPE copolymers were irradiated at varying dosages and the melt index and flow index values were measured, with the results given in Table 7. A comparison between the granular (Example 33) and pelleted (Example 34) forms of the LLDPE is presented in FIG. 4, plotting dosage versus melt and flow index values (on a logarithmic scale). The pelleted LLDPE had significantly greater drops in melt and flow indexes than the corresponding granular LLDPE.

TABLE 7

Effects of Irradiation Dosage on Melt and Flow Values

| Irradiation Dosage, (Mrad) | Melt Index, (dg/min) | Flow Index, (dg/min) | Melt-Flow Ratio |
| --- | --- | --- | --- |
| Example 33: LLDPE A (Granular, 2 MI) | | | |
| 0 | 1.97 | 50 | 25.4 |
| 0.25 | 1.27 | 45.5 | 35.8 |
| 0.5 | 1.1 | 42.2 | 38.4 |
| 1.0 | 0.7 | 40.5 | 57.9 |
| 1.5 | 0.53 | 32.8 | 61.9 |
| 2.0 | 0.31 | 28.7 | 92.6 |
| 2.5 | 0.28 | 24.2 | 86.4 |
| 3.0 | 0.18 | 20.3 | 112.8 |
| 3.5 | 0.16 | 18.5 | 115.6 |
| Example 34: LLDPE B (Pelleted) | | | |
| 0 | 1.6 | 44.9 | 28.1 |
| 0.1 | 1.45 | 44.4 | 30.6 |
| 0.25 | 1.20 | 39.8 | 33.2 |
| 0.5 | 0.61 | 31. | 50.8 |
| 1.0 | 0.16 | 15.8 | 99. |
| 1.5 | — | 2.65 | — |
| Example 35: LLDPE C (Granular, 1 MI) | | | |
| 0 | 0.91 | 23.9 | 26.3 |
| 0.2 | 0.61 | 23.4 | 38.4 |
| 0.4 | 0.49 | 21.6 | 44.1 |
| 0.5 | 0.46 | 20 | 43.5 |

Example 35 sets forth the melt index and flow index values for an irradiated higher molecular weight LLDPE, LLDPE C, having a melt index of initially approximately 1.0 dg/min. Compared to the irradiation of the 2.0 melt index LLDPE A in Example 33, the precent decrease in melt index is greater at the same dosage level for the higher molecular weight LLDPE C. As such, higher molecular weight resins provide significant improvements in rheological properties at lower irradiation dosages, than that which is achieved by lower molecular weight LLDPE.

Examples 36–46: Molecular Weight Changes Due To LLDPE Irradiation

Following the irradiation procedures set forth above and standard molecular weight test procedures, different LLDPE copolymers were subjected to various levels of irradiation, and the molecular weight measured, with the results listed in Table 8. The molecular weight of irradiated, granular LLDPE either remained relatively unchanged or decreased slightly. In contrast, there is a definite, pronounced increase in the molecular weight values for irradiated, pelleted LLDPE. As with the melt and flow index values, molecular weight values of irradiated LLDPE indicate that variations occur due to the particulate form of the resin irradiated.

TABLE 8

Irradiation Effects on Molecular Weight

| Example | LLDPE | Form | Radiation Dosage, (Mrad) | Number Average Molecular Weight, $M_n \times 10^{-3}$ (g/mole) | Weight Average Molecular Weight, $M_w \times 10^3$ (g/mole) |
|---|---|---|---|---|---|
| 36 | A | Granular | 0 | 24 | 83 |
| 37 | A | " | 0.35 | 24.0 | 82.2 |
| 38 | A | " | 0.5 | 22.6 | 74.3 |
| 39 | A | " | $0.5^a$ | 24.0 | 79.7 |
| 40 | A | " | $0.5^b$ | 23.0 | 78.0 |
| 41 | B | Pelleted | 0 | 21.9 | 78.9 |
| 42 | B | " | 0.5 | 24.7 | 93.6 |
| 43 | B | " | 1 | 25.7 | 104.8 |
| 44 | C | Granular | 0 | 15.2 | 47.9 |
| 45 | C | " | 0.5 | 15.7 | 47.8 |
| 46 | C | " | 2 | 15.1 | 53.5 |

[a] using a ⅜" bed depth during irradiation
[b] using a 1¼" bed depth during irradiation

BLOWN FILM EXPANSION (EXAMPLES 47–50)

Examples 47–50: Film Extrusion

These examples set forth studies of maximum stable film fabrication rates, with the results set forth in Table 9. Examples 47 to 49 were conducted utilizing an extruder with a 2½ inch screw with or without additional pumping with a melt pump. A 3 inch die diameter was used along with a single lip air ring. Room temperature air was used for cooling in these examples. Maximum stable rate was determined for film running in continuous operation for at least 20 minutes without signs of surging, fluctuations in bubble diameter, or other large-scale irregularities. The study was conducted utilizing neat LLDPE.

In Example 47, it was discovered that using a blend containing 10% of 0.5 Mrad LLDPE D improved the rate almost 50% over the rate of nonirradiated LLDPE D. For all examples, there was an exceptional improvement in rate for blends containing relatively low amounts, i.e. from 10 to 25 percent, of irradiated components which was much higher than a linearly additive relationship would predict.

Examples 48 and 49 demonstrate that such exceptional rates can be achieved utilizing blends of different LLDPE. Both LLDPE copolymers having melt indexes of 1 dg/min and 2 dg/min showed significant improvement upon the addition of irradiated LLDPE having a melt index of 1 dg/min.

The results in Example 49 demonstrate that higher fabrication rates can be achieved using blends of irradiated LLDPE subjected to a higher radiation dosage, than 100% irradiated LLDPE subjected to lower dosage levels.

Example 50, using a 4½" extruder, sets forth the maximum stable fabrication rates but under different extrusion conditions from the previous examples. Maximum rates were limited by die flow uniformity and cooling air distribution resulting in asymmetrical bubbles. Such limitations correspond to the limitations in maximum rate for LCB low density polyethylenes under comparable conditions. This suggests that low level irradiated LLDPE can achieve comparable film fabrication rates to LCB low density copolymers. The fabrication rates achieved in this example demonstrate up to a 57% improvement in rate for the 19% 0.4 Mrad blend over the nonirradiated LLDPE.

Film Analysis: Example 51

Film produced as in Example 50 was analyzed using the testing procedures set forth above with a results given in Table 10.

TABLE 9

Maximum Stable Fabrication Rates, lb/hr-in die

| | | | | | | BLENDS | | |
|---|---|---|---|---|---|---|---|---|
| Example | LLDPE | Nonirradiated[a] | Irradiated[a] | Dosage, (Mrad) | FIG. 5 Plot | Percent Irradiated, (%) | Estimated Rate | Observed Rate[a] |
| 47[b] | D | 9.3 (A) | 15.4 (A')[e] | 0.5 | A–A' | 10 | 9.9 | 13.4 ($X_A$) |
| | | | | | | | | 12.5[f] ($X_{A'}$) |
| | | | | | | | | 11.1[g] |
| 48[b] | A | 7 (C) | 13–16 (C') | 0.35–0.5 | C–C' | 10 | 7.6–7.9 | 11[f] ($X_C$) |
| 49[b,c] | D | 7–9.2 (B) | 11.7 (B') | 0.2 | B–B' | 20 | 7.5–10.41 | 11.3[h] ($X_B$) |
| | | | | | | | | 11.9[i] ($X_{B'}$) |
| 50[d] | D | 6.9 (D) | 10.0 (D') | 0.2 | D–D' | 23 | 7.6 | 9.8 ($X_D$) |
| | | | | | | 18 | 7.4 | 7.4[j] |
| | | | | | | 19 | 7.4 | 10.8[k] ($X_{D'}$) |

[a] FIG. 5 data points in parentheses.
[b] using 2½ extruder, 3" die.
[c] tested under less favorable conditions without melt pump.
[d] using 4½ extruder, 12.4" die.
[e] without chilled air on bubble.
[f] based on 1 Mrad irradiation of irradiated component.
[g] based on blend with nonirradiated LLDPE A and 1 Mrad irradiated component.
[h] based on blend with nonirradiated LLDPE A; less than maximum rate (not determined).
[i] based on 0.5 Mrad irradiation of irradiated component.
[j] kept at control rate well below maximum rate for comparative film testing.
[k] based on 0.4 Mrad irradiation of irradiated component.

TABLE 10

Film Properties

| Run # | LLDPR[a] % Irr. | Dosage (Mrad) | Film Thickness (mil) | BUR | Tensile Strength (psi) (MD) | Elongation (%) (MD) | Elmendorf Tear (gms/mil) (MD) | (TD) | Tensile Impact (ft-lbs³/in) (MD) | (TD) | Puncture Resistance in-lb/ml | Dart Drop, gm/mil | Specular Gloss, 45° | Maze Total | FAR |
|---|---|---|---|---|---|---|---|---|---|---|---|---|---|---|---|
| 1 | 10 | 0.2 | 1.5 | 1.6:1 | 5610 | 560 | 124 | 460 | 1360 | 940 | 16 | 74 | 35 | 20 | −20 |
| 2 | 20 | 0.2 | 1.5 | 1.6:1 | 5910 | 570 | 110 | 465 | 1370 | 930 | 15 | 74 | 33 | 17 | −20 |
| 3 | 10 | 0.4 | 1.5 | 1.6:1 | 5670 | 570 | 97 | 485 | 1390 | 920 | 15 | 76 | 34 | 18 | −20 |
| 4 | 20 | 0.4 | 1.5 | 1.6:1 | 5910 | 560 | 93 | 510 | 1340 | 910 | 18 | 92 | 32 | 20 | −20 |
| 5 | 0 | — | 1.5 | 1.9:1 | 5680 | 550 | 105 | 460 | 1460 | 930 | 24 | 87 | 43 | 16.5 | — |
| 6 | 18 | 0.2 | 1.5 | 1.9:1 | 5390 | 610 | 125 | 430 | 1450 | 1000 | 23 | 87 | 41 | 19 | — |
| 7 | 30 | 0.2 | 1.5 | 1.9:1 | 5350 | 560 | 110 | 415 | 1350 | 970 | 19 | 63 | 33 | 21 | — |
| 8 | 12 | 0.4 | 1.5 | 1.9:1 | 5910 | 540 | 81 | 500 | 1450 | 860 | 21 | 84 | 47 | 15 | — |
| 9 | 22 | 0.4 | 1.5 | 1.9:1 | 5780 | 530 | 77 | 500 | 1430 | 870 | 22 | 75 | 42 | 16 | — |
| 10 | 100 | 0.2 | 1.5 | 1.9:1 | 5350 | 580 | 78 | 410 | 1075 | 970 | 20 | 53 | 25 | 29 | — |
| 11 | 100 | 0.4 | 1.5 | 1.9:1 | 5640 | 580 | 53 | 370 | 875 | 925 | 19 | 69 | 19 | 34 | — |
| 12 | 10 | 0.2 | 1.5 | 2.5:1 | 5240 | 600 | 96 | 510 | 1450 | 890 | 15.5 | 87 | 39 | 17 | — |
| 13 | 20 | 0.2 | 1.5 | 2.5:1 | 5460 | 580 | 109 | 480 | 1400 | 740 | 16.5 | 85 | 37 | 16.5 | — |
| 14 | 10 | 0.4 | 1.5 | 2.5:1 | 5800 | 590 | 124 | 470 | 1460 | 850 | 17 | 86 | 39 | 17.5 | — |
| 15 | 20 | 0.4 | 1.5 | 2.5:1 | 5870 | 590 | 101 | 540 | 1400 | 900 | 18 | 81 | 39 | 18.5 | — |
| 16 | 10 | 0.2 | 3.0 | 1.6:1 | 5240 | 710 | 150 | 410 | 1250 | 785 | 16 | 83 | 40 | 21 | — |
| 17 | 20 | 0.2 | 3.0 | 1.6:1 | 5210 | 680 | 140 | 405 | 1245 | 770 | 15 | 86 | 42 | 19 | — |
| 18 | 10 | 0.4 | 3.0 | 1.6:1 | 5330 | 690 | 145 | 380 | 1240 | 820 | 13 | 73 | 38 | 20 | — |
| 19 | 20 | 0.4 | 3.0 | 1.6:1 | 5640 | 680 | 110 | 390 | 1210 | 810 | 14 | 86 | 33 | 21 | — |

[a]All LLDPE tested was for blends of nonirradiated LLDPE D with the indicated weight percent of irradiated LLDPE D, except for Run #7 which contained 30% irradiated LLDPE A

EXTRUSION COATING (EXAMPLES 52-54)

These examples set forth improved fabrication rates utilizing low level irradiation of LLDPE for extrusion coating, using the test procedures set forth previously. Extrusion rates of 36 lb/hr, or about 3 lb/hr-in of die for a 12 inch slot die, produced the maximum running speeds and neck-in values set forth in Table 11.

TABLE 11

Extrusion Coating Results

| Example | LLDPE | Irradiation Dosage, (Mrad) | Max. Running Speed, (ft/min) | Neck-in, (inches) |
|---|---|---|---|---|
| 52 | A | 0 | 85 | 3¼ |
|  |  | 0 | 120 | 3¾[a] |
| 53 | B | 0.5 | 85 | 2¾ |
|  |  | 0.5 | 120 | 2¾[b] |
|  |  | 0.5 | 160 | —[a] |
| 54 | B | 0.25 | 85 | 2⅝ |
|  |  | 0.25 | 120 | 2¾ |
|  |  | 0.25 | 180 | —[a] |

[a] = unstable
[b] = slight edge wave

The results demonstrate an improvement for the irradiated samples in neck-in speed of up to 30% and an increase in maximum running speed of up to 50% before draw resonance, as compared to the nonirradiated control.

We claim:

1. A polyethylene composition comprising a narrow molecular weight distribution, substantially linear, low density, copolymer of ethylene and one or more alpha-olefins said copolymer prior to crosslinking having a ratio of weight average molecular weight to number average molecular weight of between about 1 and 10 and being predominately free of long chain branching, said copolymer being crosslinked to an extent sufficient to be free of significant gelation and to provide increased extensional viscosity and substantially equivalent high shear viscosity when compared with the corresponding non-crosslinked narrow molecular weight distribution substantially linear, low density copolymer of ethylene.

2. The polyethylene of claim 1 wherein the copolymer has an increased extensional viscosity at a strain rate of 0.1 sec$^{-1}$ and a strain of 1, at 150° C. of greater than about 20% more than the corresponding extensional viscosity of the noncrosslinked form of said copolymer, and a high shear viscosity at a shear rate of 200 sec$^{-1}$ at 210° C. of less than about 20% above corresponding high shear viscosity of the noncrosslinked form of said copolymer.

3. The polyethylene of claim 2 wherein said increase in extensional viscosity is greater than about 50% and said high shear viscosity which is less than about 10% above said noncrosslinked high shear viscosity.

4. The polyethylene of claim 2 wherein said increase in extensional viscosity is greater than about 100%, and said high shear viscosity which is less than about 5% above said noncrosslinked high shear viscosity.

5. The polyethylene of claim 1 wherein the copolymer has a gel content of less than about 1 weight percent of the polymer.

6. The polyethylene of claim 5 wherein the gel content is less than about 0.1 weight percent.

7. The polyethylene of claim 1 wherein the alpha-olefin comonomers have four to eight carbon atoms.

8. The polyethylene of claim 1 wherein the alpha-olefin is one or more comonomers selected from the group consisting of butene-1, 4-methyl-pentene-1, hexene-1, heptene-1, and octene-1.

9. A film comprised of the polyethylene of a claim 1.

10. A polyethylene composition comprising a mixture of (a) a narrow molecular weight distribution, substantially linear, low density, copolymer of ethylene and one or more alpha-olefins said copolymer prior to crosslinking having ratio of weight average molecular weight to number average molecular weight of between about 1 and 10 and being predominately free of long chain branching, said copolymer being crosslinked to an extent sufficient to be free of significant gelation and to provide increased extension viscosity and substantially equivalent high shear viscosity when compared with the corresponding noncrosslinked narrow molecular weight distribution substantially liner, low density copolymer of ethylene, and (b) a noncrosslinked, narrow molecular weight distribution, linear, low density copolymer of ethylene and one or more alpha-olefins.

11. The composition of claim 10 in which said crosslinked copolymer is present in an amount of from about 1 to about 95 weight percent.

12. The composition of claim 10 in which said crosslinked copolymer is present in an amount of from about 5 to about 30 weight percent.

13. The composition of claim 10 in which said crosslinked copolymer is present in an amount of from about 10 to about 25 weight percent.

14. A process for producing polyethylene comprising irradiating a narrow molecular weight distribution, linear, low density, copolymer of ethylene and one or more alpha-olefins, said copolymer having a ratio of weight average molecular weight to number average molecular weight of between 1 and 10 and being predominately free of long chain branching and continuing irradiation until said copolymer has been subjected to and has absorbed low level, ionizing radiation to an extent sufficient to introduce crosslinks in the copolymer but insufficient to produce significant gelation.

15. The process of claim 14 wherein the amount of absorbed radiation is between about 0.05 to about 2 Mrad.

16. The process of claim 14 wherein the amount of absorbed radiation is between about 0.1 to about 1 Mrad.

17. The process of claim 14 wherein the amount of absorbed radiation is between about 0.25 to about 0.5 Mrad.

18. The process of claim 14 which said copolymer is irradiated as a particulate solid or in molten form.

19. The process of claim 18 which said copolymer is irradiated in granular form.

20. The process of claim 18 which said copolymer is irradiated in pelleted form.

21. A polyethylene produced by the process of claim 14.

22. A process for producing film comprising:
(a) irradiating a narrow molecular weight distribution, linear, low density copolymer of ethylene and one or more alpha-olefins, having a ratio of weight average molecular weight to number average molecular weight of between about 1 and 10 and being predominately free of long chain branching, with low level, ionizing radiation to an extent sufficient to introduce crosslinks into the copolymer but insufficient to provide for significant gelation followed by:
(b) extruding a melt containing the irradiated copolymer into a film; and
(c) stretching the film.

23. The process of claim 22 wherein the extent of absorbed radiation is sufficient to provide for an increase in extensional viscosity, but below a level sufficient to produce a significant increase in high shear viscosity, of the copolymer.

24. The process of claim 22 wherein the extent of absorbed radiation is below a level which produces a copolymer gel content of greater than or equal to 1 weight percent.

25. The process of claim 22 wherein the extent of absorbed radiation is between about 0.05 to about 2 Mrad.

26. The process of claim 22 wherein the extent of absorbed radiation is between about 0.01 to about 1 Mrad.

27. The process of claim 22 wherein the extent of absorbed radiation is between about 0.2 to about 0.5 Mrad.

28. The process of claim 22 wherein the copolymer is irradiated at any time from during polymerization up to extrusion of the copolymer.

29. The process of claim 22 wherein the copolymer is irradiated as a particulate solid or a melt.

30. The process of claim 29 wherein the copolymer is irradiated in granular form.

31. The process of claim 29 wherein the copolymer is irradiated in pelleted form.

32. The process of claim 22 wherein said film extruded in step (b) is tubular, and the tubular film is stretched in step (c) by blown bubble expansion.

33. The process of claim 22 wherein the film extrusion in step (b) is (1) slot cast extrusion to produce a flat film or (2) extrusion coating to produce a film coating on a substrate.

34. The process of claim 22 and in addition blending the irradiated copolymer from step (a) with a noncrosslinked, linear, low density, ethylene alpha-olefin copolymer having a narrow molecular weight distribution prior to extrusion step (b).

35. The process of claim 22 wherein a proportion of irradiated to noncrosslinked copolymer is produced by irradiating a portion of the copolymer in step (a).

36. A film produced by the process of claim 22.

* * * * *

UNITED STATES PATENT AND TRADEMARK OFFICE
CERTIFICATE OF CORRECTION

PATENT NO. : 4,525,257

DATED : June 25, 1985

INVENTOR(S) : S.J. Kurtz

It is certified that error appears in the above-identified patent and that said Letters Patent is hereby corrected as shown below:

Col. 1, line 25 "srength" should read "strength"
Col. 21, line 3, "liner" should read "linear"

Col. 22, line 21, "0.01" should be -- 0.1 --.

Signed and Sealed this

Thirty-first Day of December 1985

[SEAL]

Attest:

Attesting Officer

DONALD J. QUIGG

Commissioner of Patents and Trademarks